(12) United States Patent
Ueda et al.

(10) Patent No.: US 7,368,518 B2
(45) Date of Patent: May 6, 2008

(54) PRESSURE-SENSITIVE ADHESIVE COMPOSITION

(75) Inventors: Kazuhiko Ueda, Kobe (JP); Shintaro Komitsu, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/574,819

(22) PCT Filed: Sep. 21, 2004

(86) PCT No.: PCT/JP2004/014145

§ 371 (c)(1),
(2), (4) Date: May 11, 2006

(87) PCT Pub. No.: WO2005/033239

PCT Pub. Date: Apr. 14, 2005

(65) Prior Publication Data

US 2007/0049707 A1    Mar. 1, 2007

(30) Foreign Application Priority Data

Oct. 6, 2003    (JP) .............................. 2003-347412

(51) Int. Cl.
*C08G 77/08* (2006.01)
(52) U.S. Cl. ............................ 528/15; 528/29; 528/31; 428/447
(58) Field of Classification Search ................. 528/15, 528/31, 29; 428/447
See application file for complete search history.

(56) References Cited

U.S. PATENT DOCUMENTS

| 4,463,115 | A | | 7/1984 | Hirose et al. | |
|---|---|---|---|---|---|
| 5,138,009 | A | * | 8/1992 | Inoue | ........................... 528/15 |
| 5,288,831 | A | * | 2/1994 | Ichinohe et al. | ............... 528/25 |
| 5,539,013 | A | * | 7/1996 | Eckberg et al. | ................ 522/75 |
| 5,580,925 | A | * | 12/1996 | Iwahara et al. | .............. 525/100 |
| 5,591,820 | A | | 1/1997 | Kydonieus et al. | |
| 6,133,370 | A | * | 10/2000 | Gutek et al. | ................. 524/588 |
| 6,437,162 | B1 | * | 8/2002 | O'Lenick, Jr. | ............... 556/445 |
| 6,593,436 | B2 | * | 7/2003 | Austin et al. | ................ 525/479 |
| 6,987,157 | B2 | * | 1/2006 | Clement et al. | ............... 528/15 |

FOREIGN PATENT DOCUMENTS

| JP | 60-55056 | 3/1985 |
|---|---|---|
| JP | 4-145188 | 5/1992 |
| JP | 07-300555 | 11/1995 |
| JP | 7-300555 | 11/1995 |
| JP | 07-310066 | 11/1995 |
| JP | 2000-302981 | 10/2000 |
| JP | 2003-292926 | 10/2003 |

OTHER PUBLICATIONS

English language translation JP 2000 302981, Oct. 2000 (machine generated).*
European Office Action mailed Oct. 30, 2007 for European Application No. 04773457.9-2102 PCT/JP2004/014145.

* cited by examiner

*Primary Examiner*—Margaret G. Moore
(74) *Attorney, Agent, or Firm*—Wenderoth, Lind & Ponack, L.L.P.

(57) ABSTRACT

The present invention aims at provision of a pressure-sensitive adhesive composition that affords a cured product having good adhesive property. Reduction of the amount of tackifier resin to be used, which is attributable to the good adhesive property, is a secondary object of the present invention. The above-mentioned problem can be solved by a pressure-sensitive adhesive composition containing (A) a polyoxyalkylene polymer having at least one alkenyl group in one molecule, (B) a compound having 1 to 3 hydrosilyl groups on average in one molecule, and (C) a hydrosilylation catalyst as essential components.

18 Claims, No Drawings

PRESSURE-SENSITIVE ADHESIVE COMPOSITION

TECHNICAL FIELD

The present invention relates to a pressure-sensitive adhesive composition. More particularly, the present invention relates to a pressure-sensitive adhesive composition comprising a polyoxyalkylene polymer having an alkenyl group in one molecule, a compound having a hydrosilyl group in one molecule, and a hydrosilylation catalyst.

BACKGROUND ART

Development of a curable composition obtained by reacting a polyoxypropylene polymer having an alkenyl group and a compound having a hydrosilyl group in the presence of a platinum catalyst for use in various applications including re-peeling has been considered in view of the properties such as rapid curing ability, good curing depth, and the properties based on the structure such as affinity for various substrates, hydrophilicity, chemical stability and the like. As a method for obtaining such curable composition, a curable composition has been proposed which is obtained by reacting a polyoxypropylene polymer having an alkenyl group with organohydrogen polysiloxane having a silicon bonded hydrogen in one molecule in the presence of a platinum catalyst (e.g., JP-A-60-55056). As a method for improving compatibility and mechanical property of this curable composition, moreover, a method using, as a compound having a hydrosilyl group, organohydrogen polysiloxane having a phenyl group on the side chain has been proposed (e.g., JP-A-7-300555). In addition, a pressure-sensitive adhesive composition comprising a polyoxypropylene polymer having an alkenyl group, a compound having a hydrosilyl group, and a hydrosilylation catalyst comprising a tackifier resin has been proposed (e.g., JP-A-4-145188). However, produces resulting from curing these compositions do not necessarily have good property as an adhesive.

As other pressure-sensitive adhesives using a polyoxyalkylene polymer, pressure-sensitive adhesives using urethane crosslinking are known (e.g., JP-A-7-310066), and they have been reported to have superior properties such as adhesion to the skin, moisture permeability, water absorbability and the like. Due to urethane crosslinking, however, they are associated with problems including difficult control of curing speed, remaining unreacted isocyanate feared to have toxicity and the like.

DISCLOSURE OF THE INVENTION

The present invention aims at providing a pressure-sensitive adhesive composition capable of affording a cured product having good adhesive property. Moreover, reduction of the amount of the tackifier resin to be used, which is attributable to such good adhesive property, is a secondary object of the present invention.

As a result of various considerations, the present inventors have found that when (A) a polyoxyalkylene polymer having at least one alkenyl group in one molecule, (B) a compound having 1 to 3 hydrosilyl groups on average in one molecule and (C) a hydrosilylation catalyst are contained as essential components, good adhesive property can be expressed, which resulted in the completion of the present invention.

The pressure-sensitive adhesive composition of the present invention expresses markedly superior adhesive property by the use of a compound having 1 to 3 hydrosilyl groups on average in one molecule for a pressure-sensitive adhesive composition comprising a polyoxypropylene polymer having an alkenyl group and a compound having a hydrosilyl group as essential components.

BEST MODE FOR EMBODYING THE INVENTION

The polyoxyalkylene polymer having at least one alkenyl group in one molecule, which is component (A) in the present invention, is not particularly limited, and various polymers can be used. Specifically, a polymer having a repeating unit represented by the formula (1) as a main chain can be mentioned. Formula (1):

$$-R^1-O- \quad (1)$$

wherein $R^1$ is a divalent alkylene group.

$R^1$ in the formula (1) is preferably a linear or branched alkylene group having 1 to 14, further 2 to 4, carbon atoms. Specific examples the repeating unit represented by the formula (1) include $-CH_2O-$, $-CH_2CH_2O-$, $-CH_2CH(CH_3)O-$, $-CH_2CH(C_2H_5)O-$, $-CH_2C(CH_3)_2O-$, $-CH_2CH_2CH_2CH_2O-$ and the like. The main chain skeleton of the polyoxyalkylene polymer may consist of only one kind of repeating unit or may consist of two or more kinds of repeating units. Particularly, from the aspects of availability and workability, a polymer having $-CH_2CH(CH_3)O-$ as a main repeating unit is preferable. In addition, the main chain of the polymer may include a repeating unit other than an oxyalkylene group. In this case, the total oxyalkylene unit in the polymer is preferably not less than 80 wt %, particularly not less than 90 wt %.

The structure of the polymer for component (A) may be a linear polymer or a branched polymer, or a mixture thereof. To achieve fine adhesiveness, a linear polymer is preferably contained in not less than 50 wt %.

The polymer for component (A) preferably has a molecular weight (number average molecular weight) of 1,000-70,000, more preferably 6,000-50,000, and particularly preferably 10,000-30,000. When the number average molecular weight is less than 1,000, the obtained cured product tends to be too brittle and good adhesive property cannot be obtained. Conversely, when the number average molecular weight exceeds 70,000, the viscosity becomes too high and workability is unpreferably degraded markedly. While the number average molecular number can be measured by various methods, it is generally measured by conversion from the terminal group analysis of a polyoxyalkylene polymer, or by a gel penetration chromatography (GPC).

While the alkenyl group in component (A) is not particularly limited, an alkenyl group of the following formula (2) is preferably used. Formula (2):

$$H_2C=C(R^2)- \quad (2)$$

wherein $R^2$ is a hydrogen or a methyl group.

While the manner of bonding of an alkenyl group to a polyoxyalkylene polymer is not particularly limited, for example, a direct bond, ether bond, ester bond, carbonate bond, urethane bond, urea bond and the like of alkenyl group can be mentioned.

Specific examples of the polymer for component (A) include polymers of the formula (3):

$$\{H_2C=C(R^3)-R^4-O\}_aR^5 \quad (3)$$

wherein R³ is a hydrogen or a methyl group, R⁴ is a divalent hydrocarbon group having 1-20 carbon atoms, which optionally contains one or more ether groups, R⁵ is a polyoxyalkylene polymer residue, and a is a positive integer. R⁴ is specifically —CH₂—, —CH₂CH₂—, —CH₂CH₂CH₂—, —CH₂CH(CH₃)CH₂—, —CH₂CH₂CH₂CH₂—, —CH₂CH₂OCH₂CH₂—, —CH₂CH₂OCH₂CH₂CH₂— and the like. In view of easiness of the synthesis, —CH₂— is preferable.

Specific examples of other polymers for component (A) include a polymer having an ester bond of the formula (4):

{H₂C=C(R³)—R⁴—OC(=O)}aR⁵      (4)

wherein R³, R⁴, R⁵ and a are as defined above.

Moreover, polymer of the following formula (5):

{H₂C=C(R³)}aR⁵      (5)

wherein R³, R⁵ and a are as defined above, can be mentioned. Furthermore, a polymer having a carbonate bond of the following formula (6):

{H₂C=C(R³)—R⁴—OC(=O)O}aR⁵      (6)

wherein R³, R⁴, R⁵ and a are as defined above can be mentioned.

As the polymerization method of polyoxyalkylene polymer (A), the general polymerization method of oxyalkylene as disclosed in JP-A-50-13496 (anionic polymerization using caustic alkali), polymerization by chain extension reaction using this polymer as a starting material, which is disclosed in JP-A-50-149797 etc., polymerization using a cesium metal catalyst as disclosed in JP-A-7-179597 etc., polymerization using a porphyrin/aluminum complex catalyst as disclosed in JP-A-61-197631, JP-A-61-215622, JP-A-61-215623 and JP-A-61-218632, polymerization using a double-metal cyanide catalyst as disclosed in JP-B-46-27250, JP-B-59-15336 etc., polymerization using a catalyst comprising a polyphosphazene salt as disclosed in JP-A-10-273512 etc. can be mentioned.

In practice, from the aspects of availability of catalyst and stability of polymerization, a method using a double-metal cyanide catalyst is preferable. For production of a double-metal cyanide catalyst, known methods can be used. For example, the methods described in U.S. Pat. Nos. 3,278,457, 3,278,459, 5,891,818, 5,767,323, 5,536,883, 5,482,908, 5,158,922, 4,472,560, 6,063,897, 5,891,818, 5,627,122, 5,482,908, 5,470,813, 5,158,922 and the like are preferable.

For synthesis of a polyoxyalkylene polymer (A) having at least one alkenyl group in one molecule, general polymerization methods for producing a polyoxyalkylene polymer (anionic polymerization using caustic alkali), chain extension reaction using this polymer as a starting material, and the methods described in JP-A-61-197631, JP-A-61-215622, JP-A-61-215623, JP-A-61-218632, JP-B-46-27250, JP-B-59-15336 and the like can be mentioned.

For introduction of an alkenyl group into a polyoxyalkylene polymer, various methods can be used. For example, copolymerization of a monomer having an alkenyl group such as allylglycidyl ether and an oxyalkylene monomer can be used for the introduction. In addition, an alkenyl group can be introduced into the main chain or a side chain by reacting an oxyalkylene polymer having a functional group such as hydroxyl group, alkoxide group etc. in the main chain or a side chain with an organic compound having a functional group and an alkenyl group, which shows reactivity with those functional groups. Particularly, when an alkenyl group is present in the main chain terminal of a polymer, a cured product has a greater length of an effective network chain, and a cured product superior in mechanical properties can be preferably obtained.

Examples of the organic compound having a functional group and an alkenyl group, which shows reactivity with the above-mentioned functional groups, include acrylic acid, methacrylic acid, vinyl acetate, an acid halide of an unsaturated fatty acid having 3 to 20 carbon atoms such as acrylic chloride, acrylic bromide and the like, acid anhydride, allyl chloroformate, allyl chloride, allyl bromide, vinyl(chloromethyl) benzene, allyl(chloromethyl)benzene, allyl(bromomethyl)benzene, allyl(chloromethyl)ether, allyl(chloromethoxy)benzene, 1-butenyl(chloromethyl)ether, 1-hexenyl(chloromethoxy)benzene, allyloxy(chloromethyl) benzene and the like.

One molecule of polymer (A) contains at least 1, preferably 1-5, more preferably 1-3, further preferably 1 or 2, alkenyl groups. When the number of alkenyl group contained in one molecule of polymer (A) is less than one, curability becomes insufficient, and when the number of alkenyl group in one molecule becomes high, the network structure becomes too dense and the adhesive property is degraded. When it is 5 or above, good adhesive property is not afforded.

The compound having 1 to 3 hydrosilyl groups on average in one molecule, which is component (B) in the present invention, is not particularly limited as long as it has a hydrosilyl group. A compound having a number average molecular weight of 400-3,000 is preferable, and 500-1,000 is more preferable. When the number average molecular weight is less than 400, volatilization occurs during thermal curing and sufficiently cured product cannot be obtained, and when it exceeds 3,000, sufficient curing speed cannot be achieved. Examples of such compound include organohydrogen polysiloxane modified with an organic group, from the aspects of availability of starting material and compatibility with component (A). It is preferable that the component (B) have fine compatibility with component (A). Particularly, when the system as a whole has a low viscosity, the use of component (B) having low compatibility results in phase separation, which may cause a curing failure. Concrete examples of such structure of organohydrogen polysiloxane include chain or cyclic structures represented by

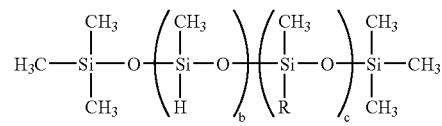

wherein 2≦b+c≦50, 1≦b≦3, 0≦c, and R is a hydrocarbon group having a main chain having 2 to 20 carbon atoms and optionally containing one or more phenyl groups,

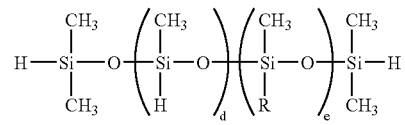

wherein 0≦d+e≦50, 0≦d≦1, 0≦e, and R is a hydrocarbon group having a main chain having 2 to 20 carbon atoms and optionally containing one or more phenyl groups, and

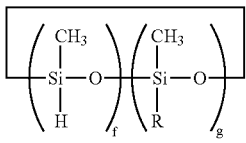

wherein $3 \leq f+g \leq 20$, $1 \leq f \leq 3$, $0 \leq g \leq 18$, and R is a hydrocarbon group having a main chain having 2 to 20 carbon atoms and optionally containing one or more phenyl groups, and the like.

A concrete example of component (B) relatively fine in compatibility with component (A) and component (C), or dispersion stability and curing speed is the following:

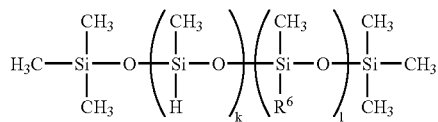

wherein $1 \leq k \leq 3$, $0 \leq l \leq 8$, and $R^6$ is a hydrocarbon group having not less than 8 carbon atoms.

A more concrete example of component (B) is a compound wherein methylhydrogenpolysiloxane is modified with α-olefin, styrene, α-methylstyrene, allyl alkyl ether, allyl alkyl ester, allyl phenyl ether, allyl phenyl ester and the like, for securing compatibility with component (A) and control of SiH amount, and one embodiment is the following structure:

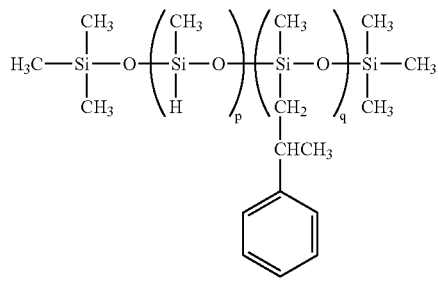

wherein $1 \leq p \leq 3$ and $1 \leq q \leq 8$.

While the detail of the mechanism that affords expression of good adhesive property of the composition in the present invention is unknown, it is assumed that a suitable crosslinking density of the cured product obtained by the present invention is effective for the expression of adhesive property. In the present invention, therefore, it is important that a hydrosilyl group-containing compound, which is component (B), contain 1 to 3 hydrosilyl groups on average in one molecule, because the molecular weight between crosslinks of a cured product can be increased by chain extension of alkenyl group-containing polyoxypropylene. It is preferable that one molecule contain 1.8-2.8, more preferably 2-2.5, hydrosilyl groups on average in one molecule. Surprisingly, even when the amount of hydrosilyl group in component (B), which is a crosslinking agent, is substantially markedly reduced as compared to the prior art, the composition can be cured at a practically sufficiently high line speed without lowering the curing speed so much. It is important that [amount of hydrosilyl group in component (B)]/[amount of alkenyl group in component (A)] be not less than 0.3 and less than 1.0, and preferable that it be within the range of not less than 0.4 and not more than 0.8. When the [amount of hydrosilyl group in component (B)]/[amount of alkenyl group in component (A)] exceeds 1.0, the crosslinking density becomes high, and adhesive property cannot be achieved when a tackifier resin is not added or added in a small amount. When the aforementioned [amount of hydrosilyl group in component (B)]/[amount of alkenyl group in component (A)] is less than 0.3, crosslinking becomes too loose and glue remainder on re-peeling and degradation of property maintenance possibly occur unpreferably.

The hydrosilylation catalyst, which is component (C) of the present invention, is not particularly limited and any can be used. Concrete examples thereof include chloroplatinic acid, free platinum, platinum solid carried on a carrier such as alumina, silica, carbon black etc.; platinum-vinyl siloxane complex {e.g., $Pt_x(ViMe_2SiOSiMe_2Vi)_y$, $Pt[(MeViSiO)_4]_z$}; platinum-phosphine complex {e.g., $Pt(PPh_3)_4$, $Pt(PBu_3)_4$}; platinum-phosphite complex {e.g., $Pt[P(OPh)_3]_4$, $Pt[P(OBu)_3]_4$}, wherein Me is methyl group, Bu is butyl group, Vi is vinyl group, Ph is phenyl group and x, y and z are integers), $Pt(acac)_2$ wherein acac is acetylacetonate, platinum-hydrocarbon complex described in U.S. Pat. Nos. 3,159,601 and 3,159,662 to Ashby et al., and platinum alcoholate catalyst described in U.S. Pat. No. 3,220,972 to Lamoreaux et al.

Examples of catalyst other than platinum compound include $RhCl(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$ and the like.

These catalysts may be used alone or in combination of two or more kinds thereof. From the aspect of catalyst activity, chloroplatinic acid, platinum-olefin complex, platinum-vinylsiloxane complex, $Pt(acac)_2$ and the like are preferable. While the amount of the catalyst to be used is not particularly limited, it is preferably within the range of $10^{-8}$-$10^{-1}$ mol per 1 mol of the alkenyl group in component (A). It is preferably within the range of $10^{-6}$-$10^{-2}$ mol. When the amount is less than $10^{-8}$ mol, the curing speed becomes low and curability becomes highly likely unstable. Conversely, when it exceeds $10^{-1}$ mol, the pot life unpreferably cannot be ensured easily.

In addition, the pressure-sensitive adhesive composition of the present invention can contain a preservation stability improver to improve preservation stability. This preservation stability improver is not particularly limited and may be any as long as it is a conventional stabilizer known to be a preservation stabilizer of component (B) of the present invention and can achieve a predetermined object. Specifically, a compound having an aliphatic unsaturated bond, an organic phosphorus compound, an organic sulfur compound, a nitrogen-containing compound, a tin compound, an organic peroxide and the like can be preferably used. Specific examples include, but are not limited to, 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, vitamin E, 2-(4-morpholidinyl dithio)benzothiazole, 3-methyl-1-buten-3-ol, acetylenic unsaturated group-containing organosiloxane, acetylene alcohol, 3-methyl-1-butyl-3-ol, diallyl fumarate, diallyl maleate, diethyl fumarate, diethyl maleate, dimethyl maleate, 2-pentenenitrile, 2,3-dichloropropene and the like.

Moreover, the pressure-sensitive adhesive composition of the present invention can contain, where necessary, adhesive additives for improving adhesiveness to various substrates (metal-core, plastic film, metal foil, paper etc.). As the adhesive additive, various silane coupling agents, epoxy resins and the like can be mentioned. Particularly, a silane coupling agent having a functional group such as epoxy group, methacryloyl group, vinyl group and the like can be used easily because it shows a small influence on the curability and a great effect on the expression of adhesiveness. However, usable silane coupling agents are not limited to those mentioned above. It is also possible to use a catalyst for reacting a silyl group and an epoxy group, in combination with a silane coupling agent and an epoxy resin. For use thereof, an influence on the hydrosilylation reaction should be considered.

In addition, the pressure-sensitive adhesive composition of the present invention can contain various fillers, antioxidants, UV absorbers, pigments, surfactants, solvents and silicon compounds as appropriate. Specific examples of the above-mentioned filler include silica fine powder, calcium carbonate, clay, talc, titanium oxide, zinc oxide, diatom earth, barium sulfate and the like.

In the present invention, a tackifier resin can be added as necessary to improve properties such as tackiness and the like. As the above-mentioned tackifier resin, for example, terpene resin, terpenephenol resin, petroleum resin, rosin ester and the like can be mentioned, from which a resin suitable for use can be selected freely.

For improving properties, resins such as phenol resin, acrylic resin, styrene resin, xylene resin and the like can be added. In addition, an adhesive component such as acrylic adhesive, styrene block adhesive, olefin adhesive and the like can be added for a similar purpose.

In the present invention, since a curable composition is cured by an addition reaction of an Si—H group to an alkenyl group using a hydrosilylation catalyst, the curing speed is very fast, which is convenient for a line production system. In addition, the problems associated with the use of urethane crosslinking as disclosed in JP-A-07-310066 and the like such as remaining unreacted isocyanate and the like are absent.

The production method of an adhesive product using the pressure-sensitive adhesive composition of the present invention is now-explained by referring to an example of the manufacturing process. As the above-mentioned production method, however, any method may be employed as long as it includes coating a substrate with a pressure-sensitive adhesive composition and thermal curing thereof, and is not limited to the following examples.

The pressure-sensitive adhesive composition of the present invention is applied to a substrate with a coater, which is then thermally cured to give an adhesive product. As the substrate, a film made of a synthetic resin or modified natural substance, paper, any kind of fabric, metal foil and the like can be used. Specific examples of the substrate include, but are not limited to, polyethylene, polypropylene, polyimide, polycarbonate, polyvinyl chloride, polyester, polyurethane, cellophane, impregnated paper, coated paper, quality paper, kraft paper, fabric, acetate fabric, non-woven fabric, glass fabric and metal foil. These may be used alone or may be used as a laminate of at least two or more kinds thereof.

For coating, both of a method including directly coating a substrate and a method including coating a release paper, curing, and transferring the coating film to a substrate can be employed. To control viscosity of a pressure-sensitive adhesive composition, a small amount of compound (B) may be added to polymer (A) for pre-gelation and the thickened pressure-sensitive adhesive composition may be applied.

It is effective to add additives such as repelling preventive, release promoter etc. to ensure coatability to a substrate, a release paper and the like. As the repelling preventive and the release promoter, silicone, acrylic, fluorine agents and the like can be used.

As the release paper to be used for the method including coating a release paper, curing, and transferring the coating film to a substrate, a release paper coated with silicone, olefin, fluorine releasing agents and the like can be used, and from the aspects of cost and ensured release property, use of olefin and solvent-free silicone releasing agents is particularly preferable.

While the method of thermal curing is not particularly limited, the temperature varies depending on the kinds of the polymer to be used and the compound to be added and the like, and is generally preferably within the range of 50° C.-180° C. While the curing time varies depending on the polymer to be used, the compound to be added, the reaction temperature and the like, it is within the range of generally 0.1 min-24 hr, preferably 1 min-10 hr, more preferably 1 min-1 hr.

The pressure-sensitive adhesive composition of the present invention has a high curing speed, and is also preferable for line-production systems. In addition, good adhesive property can be expressed even when a solvent is not used during production and a thermoplastic component such as tackifier resin and the like is not contained. Thus, the composition is hygienic, shows low temperature dependency and low release rate dependency of the adhesive property and is stable in the adhesive property.

The pressure-sensitive adhesive composition of the present invention can be used for various adhesive products for general office work, PP film adhesion, removing, general packaging, electrical use and fixing. An adhesive product comprising the pressure-sensitive adhesive composition of the present invention can be used for pressure-sensitive adhesive tape for packaging, pressure-sensitive adhesive tape for office work, masking tape for painting, pressure-sensitive adhesive tape for electric insulating, pressure-sensitive adhesive tape for binding, pressure-sensitive adhesive tape for protection, pressure-sensitive adhesive tape and sheet for identification/decoration, two sided pressure-sensitive adhesive tape, electromagnetic interference preventive film and tape, removable film and tape, decorative lamination film, tape for transporting semiconductor chip, marking film, protective film for deep draw processing, glass breakage preventative film, foaming pressure-sensitive adhesive tape, waterproof/water stop tape, anticorrosion pressure-sensitive adhesive tape, pressure-sensitive adhesive tape for surface protection, pressure-sensitive adhesive tape for dicing, pressure-sensitive adhesive tape for back grinding, pressure-sensitive adhesive sheet for printing, adhesive label and the like.

For manufacture of the above-mentioned adhesive products, electromagnetic absorptive materials, light absorbers, foaming components and the like can be added according to these uses.

EXAMPLE

The present invention is explained in detail in the following by referring to Examples, which are not to be construed as limitative.

Production Example 1

Polyoxypropylene glycol having a number average molecular weight of 3,000, which was obtained by polymerizing according to the method of Comparative Synthetic Example 1 of JP-A-5-117521 using caustic alkali as a catalyst, alkali and dihalomethane were reacted to allow molecular chain extension. The terminal was converted to an allyl group with allyl chloride, and the mixture was purified by desalting to give polyoxyalkylene polymer (A-1) having a number average molecular weight by GPC of 13,800 and generally having two allyl terminals in one molecule. The amount of the allyl terminal group of the obtained polyoxyalkylene polymer having an allyl terminal was 0.24 mmol/g.

Production Example 2

Using an oxypropylene polymer obtained by polymerization of propylene oxide using polyoxypropylene glycol having a number average molecular weight of 3,000, which was obtained, by polymerization using a double-metal cyanide catalyst (zinc hexacyano cobaltate) and caustic alkali as a catalyst, and according to the method of JP-A-5-117521, Synthetic Example 1, a compound having a number average molecular weight of 28,000 was obtained. The terminal was converted to an allyl group with 28% methanol solution of sodium methylate and allyl chloride, and the mixture was purified by desalting to give polyoxyalkylene polymer (A-2) generally having two allyl terminals in one molecule. The amount of the allyl terminal group of the obtained polyoxyalkylene polymer having an allyl terminal was 0.12 mmol/g.

Production Example 3

To methylhydrogensilicone having five (—Si—O—) repeating units on average was added α-methylstyrene in a 0.6 equivalent amount of the total amount of hydrosilyl group in the presence of a platinum catalyst and a compound (B-1) having two hydrosilyl groups on average in one molecule was obtained. The Si—H group content of this compound was 2.5 mmol/g.

Production Example 4

To methylhydrogensilicone having five (—Si—O—) repeating units on average was added α-methylstyrene in a 0.4 equivalent amount of the total amount of hydrosilyl group in the presence of a platinum catalyst and a compound (B-2) having three hydrosilyl groups on average in one molecule was obtained. The Si—H group content of this compound was 4.1 mmol/g.

Production Example 5

To methylhydrogensilicone having five (—Si—O—) repeating units on average was added α-methylstyrene in a 0.5 equivalent amount of the total amount of hydrosilyl group in the presence of a platinum catalyst and a, compound (B-3) having 2.5 hydrosilyl groups on average in one molecule was obtained. The Si—H group content of this compound was 3.2 mmol/g.

Production Example 6

To methylhydrogensilicone having ten (—Si—O—) repeating units on average was added α-methylstyrene in a 0.5 equivalent amount of the total amount of hydrosilyl group in the presence of a platinum catalyst and a compound (B-4) having 5 hydrosilyl groups on average in one molecule was obtained. The Si—H group content of this compound was 4.2 mmol/g.

Production Example 7

To methylhydrogensilicone having ten (—Si—O—) repeating units on average was added α-methylstyrene in a 0.2 equivalent amount of the total amount of hydrosilyl group in the presence of a platinum catalyst and a compound (B-5) having 8 hydrosilyl groups on average in one molecule was obtained. The Si—H group content of this compound was 8.0 mmol/g. (Examples 1-6) and (Comparative Examples 1-8)

The polyoxyalkylene with terminal allyl group polymers (A-1, A-2) obtained in Production Examples 1 and 2, hydrosilyl compounds (B-1), (B-2), (B-3), (B-4) and (B-5) as components (B), a hindered phenol antioxidant (Irganox 1010 manufactured by Ciba-Geigy Ltd.), and platinum vinylsiloxane (3% platinum isopropanol solution) and dimethyl maleate were measured in the amounts shown in Table 1.

TABLE 1

| | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|
| A-1 | 100 g | 100 g | | | | | 100 g | 100 g | | | | |
| A-2 | | | 100 g | 100 g | 100 g | 100 g | | | 100 g | 100 g | 100 g | 100 g |
| B-1 | 6.2 g | 7.2 g | 2.9 g | 3.4 g | | | | | | | | |
| B-2 | | | | | 1.1 g | | | | | | | |
| B-3 | | | | | | 1.8 g | | | | | | |
| B-4 | | | | | | | 2.9 g | 3.5 g | 1.1 g | 1.4 g | | |
| B-5 | | | | | | | | | | | 0.6 g | 0.7 g |
| platinum vinylsiloxane | 100 μl | 100 μl | 100 μl | 100 μl | 100 μl | 100 μl | 100 μl | 100 μl | 100 μl | 100 μl | 100 μl | 100 μl |
| dimethyl maleate | 20 μl | 20 μl | 20 μl | 20 μl | 20 μl | 20 μl | 20 μl | 20 μl | 20 μl | 20 μl | 20 μl | 20 μl |
| molar amount of hydrosilyl group relative to allyl terminal | 0.6 | 0.7 | 0.6 | 0.7 | 0.4 | 0.5 | 0.5 | 0.6 | 0.4 | 0.5 | 0.4 | 0.5 |

A pressure-sensitive adhesive composition was applied to a 38 μm-thick polyester film with a roll coater at room temperature to a width 8 cm and a thickness 75 μm and cured by heating at 130° C. for 3 min, after which curability, adhesive force and retention were measured. For adhesive force, the adhesive film prepared above was cut into a 20 mm wide rectangle strip, adhered to a stainless plate SUS304 (width 25 mm) to be applied to, which was polished on the surface with No. 280 sandpaper. After standing for 60 min, a 180 degree peeling off test was performed at 23° C. and a rate of 300 mm/min, and the force necessary for peeling off was measured. The curability was confirmed by the attachment of an uncured polymer to the stainless plate used for peeling off during measurement of the adhesive force. The results of the adhesive force and curability are shown in Table 2. For retention, the pressure-sensitive adhesive film prepared above was cut into a 20 mm wide rectangle strip, adhered to a stainless plate SUS304 to be applied to, which was polished on the surface with No. 280 sandpaper. The laminate was perpendicularly stood, the upper end was fixed, and one end of the pressure-sensitive adhesive film was bent. A spindle having a given weight was hung at the tip thereof and the distance of the film peeled off in 60 min was measured. As to the tape 60 mm of which was peeled off within 60 min., the time necessary for peeling off 60 mm thereof was measured. The results are shown in Table 3.

TABLE 2

|  | adhesive force [N/20 mm] | curability |
| --- | --- | --- |
| Ex. 1 | 2.1 | No attachment |
| Ex. 2 | 1.5 | No attachment |
| Ex. 3 | 3.0 | No attachment |
| Ex. 4 | 1.6 | No attachment |
| Ex. 5 | 2.1 | No attachment |
| Ex. 6 | 1.8 | No attachment |
| Com. Ex. 1 | 0.5 | No attachment |
| Com. Ex. 2 | 0.4 | No attachment |
| Com. Ex. 3 | 0.8 | No attachment |
| Com. Ex. 4 | 0.6 | No attachment |
| Com. Ex. 5 | 0.7 | No attachment |
| Com. Ex. 6 | 0.6 | No attachment |

TABLE 3

|  | weight of spindle | distance of peeling off in 60 min | 60 mm peel off time |
| --- | --- | --- | --- |
| Ex. 1 | 3 g | 0 mm | — |
| Ex. 2 |  | 0 mm | — |
| Com. Ex. 1 |  | — | 200 seconds |
| Com. Ex. 2 |  | — | 120 seconds |
| Ex. 3 | 8 g | 0 mm | — |
| Ex. 4 |  | 10 mm | — |
| Ex. 5 |  | 30 mm | — |
| Ex. 6 |  | 0 mm | — |
| Com. Ex. 3 |  | — | 240 seconds |
| Com. Ex. 4 |  | — | 120 seconds |
| Com. Ex. 5 |  | — | 240 seconds |
| Com. Ex. 6 |  | — | 90 seconds |

As shown in Examples 1-6, a pressure-sensitive adhesive composition wherein component (B) comprises 1 to 3 hydrosilyl groups in one molecule showed superior adhesive property as compared to a pressure-sensitive adhesive composition wherein component (B) comprises many hydrosilyl groups in one molecule, as shown in Comparative Examples 1 to 7.

What is claimed is:

1. A composition capable of being crosslinked to form a pressure sensitive adhesive having a network structure, said composition comprising (A) a polyoxyalkylene polymer having at least one alkenyl group in one molecule, (B) a compound having 1 to 3 hydrosilyl groups on average in one molecule and (C) a hydrosilylation catalyst as essential components.

2. The composition of claim 1, wherein said compound (B) has a structural formula represented by the following formula (I):

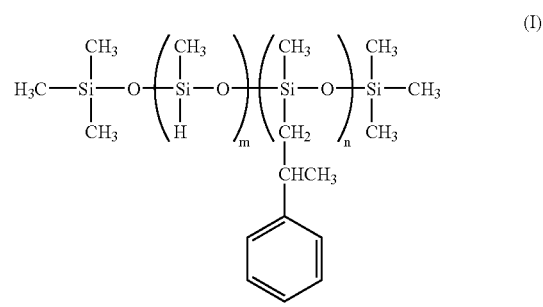

(1≦m≦3, 1≦n≦8).

3. The composition of claim 1, wherein said compound (B) has 1.8-2.8 hydrosilyl groups on average in one molecule and a number average molecular weight of 400-3000.

4. The composition of claim 1, wherein [amount of hydrosilyl group in said compound (B)]/[total amount of alkenyl group in component (A)] is 0.4-0.8.

5. The composition of claim 1, wherein the polyoxyalkylene polymer having an alkenyl group for said (A) has a number average molecular weight of 6,000-50,000.

6. The composition of claim 1, wherein the polyoxyalkylene polymer for said (A) has 1-2 alkenyl groups on average in one molecule.

7. The thermally cured composition of claim 1.
8. The thermally cured composition of claim 2.
9. The thermally cured composition of claim 3.
10. The thermally cured composition of claim 4.
11. The thermally cured composition of claim 5.
12. The thermally cured composition of claim 6.
13. An adhesive product comprising the composition of claim 1 thermally cured on a substrate.
14. An adhesive product comprising the composition of claim 2 thermally cured on a substrate.
15. An adhesive product comprising the composition of claim 3 thermally cured on a substrate.
16. An adhesive product comprising the composition of claim 4 thermally cured on a substrate.
17. An adhesive product comprising the composition of claim 5 thermally cured on a substrate.
18. An adhesive product comprising the composition of claim 6 thermally cured on a substrate.

* * * * *